(No Model.)

G. BOULET, FILS & E. DONARD.
DRIER.

No. 496,217. Patented Apr. 25, 1893.

WITNESSES:
George Baumann
James Gracir

INVENTORS
Gaston Boulet fils
Eugene Donard
BY Howson and Howson
their ATTORNEYS

UNITED STATES PATENT OFFICE.

GASTON BOULET, FILS, AND EUGENE DONARD, OF ROUEN, FRANCE.

DRIER.

SPECIFICATION forming part of Letters Patent No. 496,217, dated April 25, 1893.

Application filed August 18, 1892. Serial No. 443,365. (No model.) Patented in Belgium July 16, 1892, No. 94,534; in France July 18, 1892, No. 223,002, and in England July 19, 1892, No. 13,242.

*To all whom it may concern:*

Be it known that we, GASTON BOULET, Fils, and EUGENE DONARD, citizens of the Republic of France, and residents of Rouen, France, have invented Improvements in Driers, (for which we have obtained Letters Patent in Belgium, dated July 16, 1892, No. 94,534; in France, dated July 18, 1892, No. 223,002, and in England, dated July 19, 1892, No. 13,242,) of which the following is a specification.

Our invention has more particular reference to that class of rotary drying or evaporating apparatus in which steam tubes are used and which are designed more especially for the drying of solid or semi-solid organic matters, either animal or vegetable, such for instance as mash from distilleries and breweries and other industrial residues or products.

The object of our invention is mainly to secure simplicity and economy in the construction of the drier and to secure efficiency of operation under all conditions without liability to break-downs.

Figure 1:
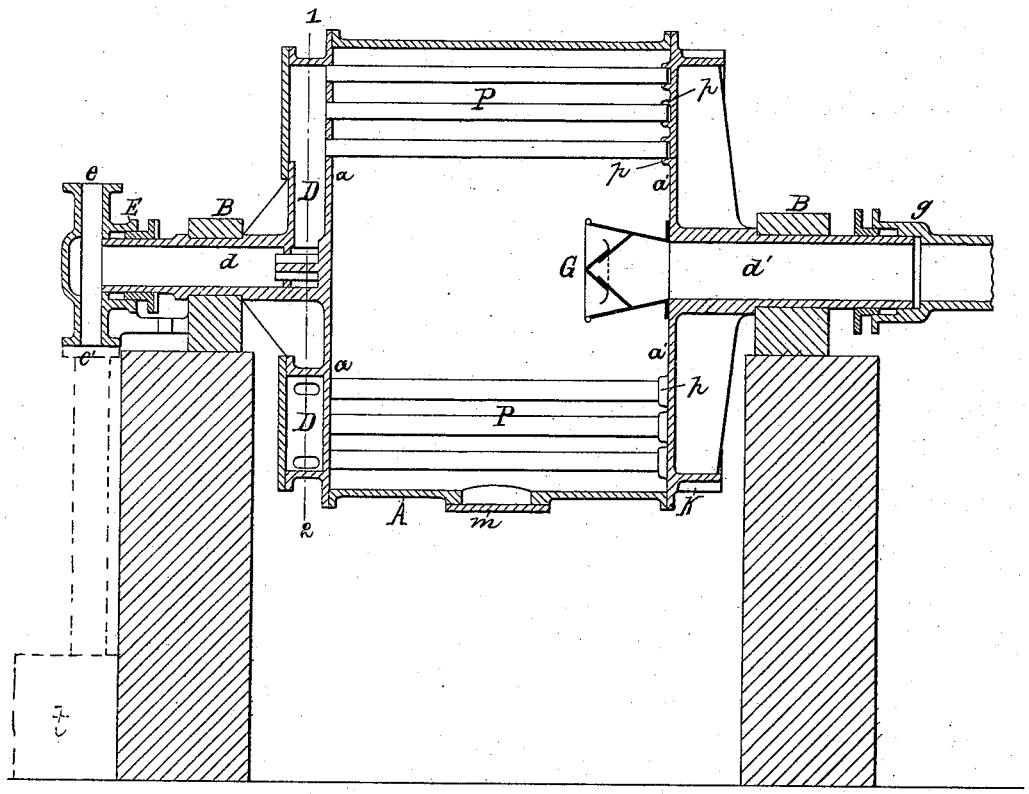
Figure 4:
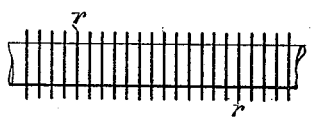
Figure 2:
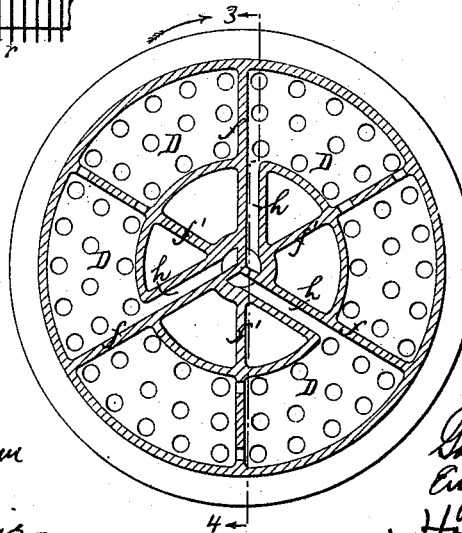
Figure 3:
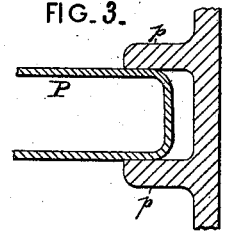

In the accompanying drawings Figure 1 is a longitudinal section on the line 3—4, Fig. 2 of our improved drier, which is here shown as adapted to operate under a vacuum. Fig. 2 is a vertical section on the line 1, 2 Fig. 1. Fig. 3 is a sectional view drawn to a larger scale to illustrate the manner of mounting the steam tubes. Fig. 4 is a view illustrating a modification.

In those driers in which steam tubes are used, if the tubes are fixedly secured to the opposite cylinder heads, damage is apt to result from unequal expansion and contraction of the parts. It has been attempted to overcome this difficulty by securing the steam tubes at one end only, while at the other end of the cylinder they are passed through stuffing boxes. This, however, necessitates considerable expense in construction. We meet these difficulties and secure economy of construction by constructing the tubes so that they are fixed to but one of the cylinder heads, while their opposite ends are supported by lugs or in recesses on the inner face of the other cylinder head, permitting the tubes to expand and contract longitudinally under the varying degrees of temperature to which they may be subjected.

In the form in which we prefer to construct our apparatus, as shown in the accompanying drawings, the rotating cylinder A has the opposite heads or ends $a$ and $a'$ with hollow journals $d$ and $d'$ mounted in bearings B on a suitable foundation or support. The hollow journal $d$ turns in a stuffing box E which forms part of a fixed hollow casing provided with a steam inlet $e$ and an outlet $e'$ leading to a steam trap $t$ for the water of condensation. The inner end of this journal $d$ opens into a steam space D provided on the head or end $a$ of the rotary cylinder. This steam chamber D is, as shown in Fig. 2, divided into two or more parts (three in the present instance) by radial partitions $f$, the steam chamber itself being preferably annular, as shown in Fig. 2. Each part of the steam chamber D is in communication with the hollow journal $d$ through a radial passage $h$ adjacent to the radial partition $f$. A second set of radial partitions $f'$ may be provided, as shown in Fig. 2, to increase the strength of the cylinder head, but in such case the parts of the radial partitions $f'$ within the steam chamber D should be perforated as shown for the free passage of the steam and water of condensation.

Into the portions of the cylinder head $a$ adjacent to the steam chamber D are fixed the open ends of a series of longitudinal steam pipes P so that the interior of the latter will be open to the interior of the steam chamber for the free admission of steam into the tubes or pipes. The inner face of the opposite cylinder head $a'$ is provided with a series of lugs or projections $p$, preferably of the annular form indicated in the drawings for the reception of the ends of the steam tubes with a more or less snug fit, but the tubes and projections must be of such length as to allow for free longitudinal expansion and contraction of the tubes under all the degrees of temperature to which they are likely to be subjected. As shown in Fig. 4, we close the ends of the pipes or tubes P which fit into the recesses in the cylinder head $a'$ so as to avoid any possibility of leakage of steam or water into the interior of the drier.

In order to give an increased heating surface within a given space and size of drier, the heating tubes P may, as shown in Fig. 4, be provided with annular ribs $r$ on their outer surfaces.

The drier illustrated in the drawings is, as we have said, constructed for operation under a vacuum, and for that purpose the cylinder is a closed one, and the hollow journal $d'$ is in communication with the interior of the drier, being provided there with a shield or guard G to prevent the material under treatment from being drawn into the suction pipe, to which the hollow journal $d'$ is connected with a stuffing box connection $g$, as illustrated in Fig. 1.

We prefer to arrange the gear wheel K by which rotary motion is imparted to the cylinder, on the outer side of the head $a'$, as shown in Fig. 1.

The operation of the above described apparatus will be readily understood from the foregoing description, the material being introduced into and withdrawn from the cylinder through a manhole $m$. It may be observed, however, with reference to the water of condensation that as the cylinder is turned in the direction of the arrow Fig. 2, the water of condensation in the steam tube will collect in the lower part of the corresponding division of the steam chamber D, and as each partition $f$ rises toward the upper part of its travel the water of condensation in that division of the steam chamber will flow down through the passage $h$ into the hollow journal $d$ and so out through the discharge passage $e'$.

We claim as our invention—

A rotary drier consisting of a rotary closed cylinder having at one end a steam chamber with an inlet for the steam and an outlet for the water of condensation and steam tubes open at one end and closed at the other, the open ends of the steam tubes being secured in the cylinder head adjacent to the steam chamber, while their closed ends are supported by lugs or projections on the inner face of the opposite cylinder head to permit of expansion and contraction, all substantially as described.

In testimony whereof we have signed our names to this specification in the presence of two subscribing witnesses.

G. BOULET, FILS.
EUG. DONARD.

Witnesses:
A. WIMPLER,
P. DUMENIL.